March 2, 1948.                J. E. LANCASTER                2,436,866
                                MECHANICAL SEAL
                              Filed Oct. 23, 1946

J. E. LANCASTER
   INVENTOR.

BY *Robt Meyer*
   *attorney*

Patented Mar. 2, 1948

2,436,866

UNITED STATES PATENT OFFICE 2,436,866

MECHANICAL SEAL

John E. Lancaster, New York, N. Y., assignor to Worthington Pump and Machinery Corporation, Harrison, N. J., a corporation of Delaware Application October 23, 1946, Serial No. 705,033

3 Claims. (Cl. 286—9)

1

This invention relates to a mechanical seal for preventing the escape of fluid through the joint between a rotating shaft and the wall of a fluid containing vessel.

While this seal is particularly adapted for use in pumps for corrosive liquids, its desirable features are equally attractive in other fields of application.

The primary object of this invention is to provide a mechanical seal of simple design and construction which may be easily assembled and disassembled by persons having no indoctrination in the art.

A second object is to lower the initial and replacement costs of a seal by providing a construction in which the members receiving the maximum corrosive and wearing action are of simple annular shape so that they may be easily and cheaply manufactured from corrosion resisting and wear resisting material.

Another object is to provide a novel means for transmitting rotary motion from the shaft to one of the sealing members.

An additional object is to provide means for fixing one of the sealing members to the wall of the vessel and draining fluid leaking between the sealing members.

With these and other objects in view, as may appear from the accompanying specification, the invention consists of various features of construction and combination of parts, which will be first described in connection with the accompanying drawings, showing a mechanical seal for rotating shafts of a preferred form embodying the invention, and the features forming the invention will be specifically pointed out in the claims.

Figure 1:
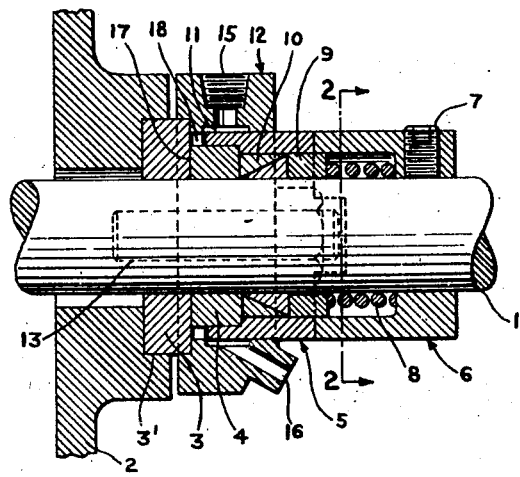
Figure 1 is a vertical cross section of a joint employing a seal as disclosed by this invention.
Figure 2:
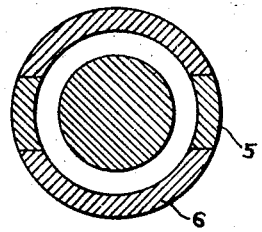
Figure 2 is a section taken along the line 2—2 of Figure 1.
Figure 3:
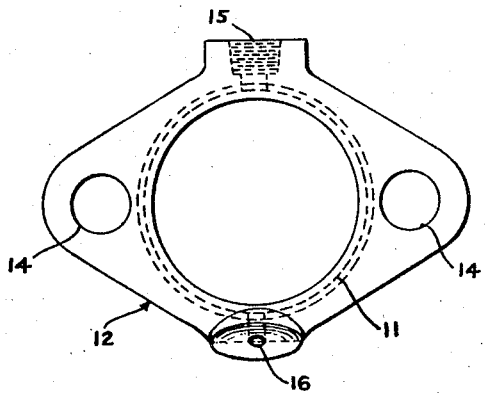
Figure 3 is a detail plan view of the clamping member.
Figure 4:
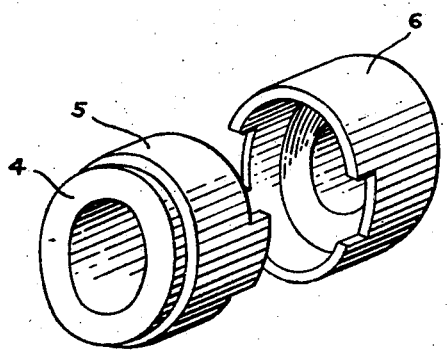
Figure 4 is a perspective view of the collar and back-up member showing the means for transmitting rotary motion.

Referring to the drawings, 1 represents a shaft rotating in and through the wall 2 of a vessel. The outside of the wall 2 is preferably adapted at 3' to provide a snug recess for sealing ring 3. Sealing ring 3 is stationary and fixed to the wall 2 by a clamping member 12. The sealing ring 3 acts as a bushing for the rotating shaft 1 as well as a seal against fluid passing from the interior of the vessel and is therefore made from material having both good corrosion and good wear resistance.

Bearing against the outer face of the first sealing ring 3 is a second sealing ring 4. The second ring 4, as will presently be described, rotates with the shaft 1 and is also composed of material having suitable wear and corrosion resistance.

Second sealing ring 4 is pressed into or otherwise fixed to the collar 5 and moves with it. The collar 5, has fingers or projections at its outer end which engage for rotary motion with registering slots on the inner end of the cylindrical back-up member 6. Back-up member 6 is fixedly related to the shaft 1 by suitable means such as radially extending set screws 7. Rotary motion is therefore transmitted from the shaft 1 to the back-up member 6 and through the fingers and slots to the collar 5 and sealing ring 4. The finger and slot attachment of collar 5 and back-up member 6 is similar to a jaw clutch arrangement and while the members are joined for rotary movement, relative or independent axial movement of the collar 5 and ring 4 may occur with respect to the shaft 1, and back-up member 6.

The outer end of the cylindrical back-up member 6 is machined to fit the rotating shaft 1 and carry the set screws 7 but the inner portion is bored to a diameter somewhat larger than the shaft 1. A spring 8 fits around shaft 1 in back-up member 6 and bears against the inside of its outer end. The other end of the spring 8 forces a compression ring 9 against the wedge shaped packing 10 which transmits the pressure to the sealing ring 4. Since sealing ring 4 is mounted for relative axial movement, pressure of spring 8 forces it against the face of sealing ring 3. Pressure of the spring 8 on the wedge shaped packing rings 10 also forces them laterally against the shaft 1 and the inside wall of the collar 5 to prohibit passage of fluid beyond the packing rings. Any fluid leaking by the first sealing ring 3 will therefore be forced to pass through the joint 17 formed by the interacting faces of the sealing rings 3 and 4. An annular passage 18 between ring 4 and member 12 connects the joint 17 to an internal annular drain off groove 11 in the clamp member 12 from which the fluid can be drained by means of outlet 16.

The clamp member 12 which holds the sealing ring is fixed to the wall 2 by means of bolts 13 passing through holes 14 in the flanges of the member 12. The member 12 also has a lubrication inlet 15 leading to the internal drain-off ring 11 whereby a suitable lubricating medium may be supplied to the wearing parts.

When leakage becomes excessive, it is a simple matter to disassemble the seal and replace the worn parts. This may be accomplished either by unloosening set screws 7 and sliding off the back-up member 6 or by moving the vessel and wall 2. The sealing ring 4 and the packing rings 10 may then be replaced. If sealing ring 3 is worn, clamp member 12 must also be removed.

Since the repair parts 3, 4 and 10 are of inexpensively prepared annular shape and their replacement requires no trained personnel, maintenance costs of this type of seal are reduced to a minimum.

What is claimed is:

1. In a mechanical seal for a shaft rotating in a fluid containing vessel, a first sealing member, a second sealing member, deformable packing members comprising wedge shaped rings having their wedge faces interacting, a compression member, a spring member, a back-up member for said spring member, means for fixing said back-up member to the shaft for motion therewith, each of said members being of annular form with shaft receiving openings and arranged in series relationship, a collar member, said second sealing member being attached to said collar member for movement therewith, means for transmitting rotary motion from the back-up member to the collar member and the second sealing member, said last mentioned means being constructed and arranged to permit axial movement of said collar relative to the shaft and back-up member, a clamp member for fixing said first sealing member to the vessel, said clamp member fitting about said collar member and having an internal annular groove with an outlet therefrom for draining off fluid leaking through the interacting faces of said first and second sealing members.

2. In a mechanical seal for a shaft rotating in a fluid containing vessel, a first sealing member, a second sealing member, deformable packing members comprising wedge shaped rings having their wedge faces interacting, a compression member, a spring member, a back-up member for said spring member, means for fixing said back-up member to the shaft for motion therewith, each of said members being of annular form with shaft receiving openings and arranged in series relationship, a clamp member for fixing said first sealing member to the vessel, said clamp member fitting about said collar member and having an internal annular groove with an outlet therefrom for draining off fluid leaking through the interacting faces of said first and second sealing members, and means for transmitting rotary motion from the back-up member to the collar member and the second sealing member, said last mentioned means comprising registering slots and fingers on said back-up member and said collar member whereby said collar member is attached to said back-up member for rotary motion therewith but is capable of axial movement relative thereto.

3. In a mechanical seal for a shaft rotating in a fluid containing vessel, a first sealing member, a second sealing member, deformable packing members comprising wedge shaped rings having their wedge faces interacting, a compression member, a spring member, a back-up member for said spring member, means for fixing said back-up member to the shaft for motion therewith, each of said members being of annular form with shaft receiving openings and arranged in series relationship, a clamp member for fixing said first sealing member to the vessel, said clamp member fitting about said collar member and having an internal annular groove with an outlet therefrom for draining off fluid leaking through the interacting faces of said first and second sealing members, and means for transmitting rotary motion from the back-up member to the collar member and the second sealing member, said last mentioned means comprising registering slots and fingers on said back-up member and said collar member whereby said collar member is attached to said back-up member for rotary motion therewith but is capable of axial movement relative thereto, said spring member acting through said compression member to force said wedge shaped packing members laterally against collar member and the shaft and axially against said second sealing member to hold the second sealing member in intimate contact with the first sealing member.

JOHN E. LANCASTER.

REFERENCES CITED

The following references are of record in the file of this patent:

UNITED STATES PATENTS

| Number | Name | Date |
| --- | --- | --- |
| 813,398 | Barnes | Feb. 27, 1906 |
| 1,895,497 | Steefel | Jan. 31, 1933 |
| 2,025,279 | Gilman | Dec. 24, 1935 |
| 2,112,461 | Kohler | Mar. 29, 1938 |
| 2,328,328 | Curtis | Aug. 31, 1943 |
| 2,374,353 | Jacobsen | Apr. 24, 1945 |

FOREIGN PATENTS

| Number | Country | Date |
| --- | --- | --- |
| 7,369 | Great Britain | 1910 |